C. W. WARD.
VALVE.
APPLICATION FILED JAN. 19, 1912.

1,062,064.

Patented May 20, 1913.

Witnesses
J. Otto Baenziger

Inventor
Charles W. Ward
By Whittemore Hulbert & Whittemore
Attorneys

UNITED STATES PATENT OFFICE.

CHARLES W. WARD, OF HANCOCK, MICHIGAN.

VALVE.

1,062,064.  Specification of Letters Patent.  Patented May 20, 1913.

Application filed January 19, 1912. Serial No. 672,200.

*To all whom it may concern:*

Be it known that I, CHARLES W. WARD, a citizen of the United States of America, residing at Hancock, in the county of Houghton and State of Michigan, have invented certain new and useful Improvements in Valves, of which the following is a specification, reference being had therein to the accompanying drawings.

The invention relates to valves of that type in which the straight-way passage is formed through the valve case which is closed by a peripherally actuated pivotal gate valve.

It is the object of the invention to obtain a simple construction and one in which the packing is automatically effected, thereby preventing leakage.

Figure 2:
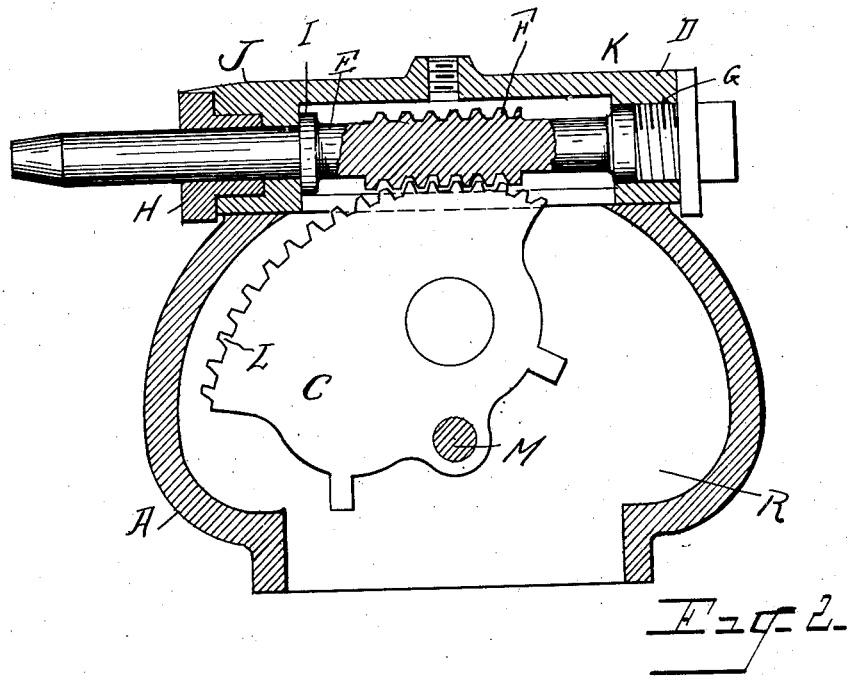
Figure 1:
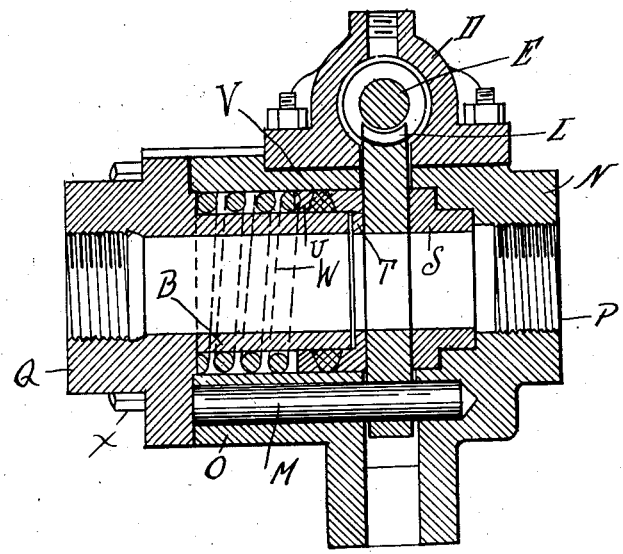

In the drawings,—Figure 1 is a cross section through the valve; Fig. 2 is a longitudinal section therethrough.

A is a cast metal casing which is cored to form therein a segmental chamber B for receiving a disk gate valve C. The top of this casing is provided with an opening of sufficient area for the insertion of the valve C therethrough and this opening is closed by a cap casing D which also forms the housing for a rotary stem E having a worm F formed on the central portion thereof. This worm is engaged with the cap casing through an aperture at one end thereof and which is closed by a plug cap G. At the opposite end of the cap casing is a packing gland H which surrounds the stem E, the latter being provided with a thrust bearing collar I engaging a bearing J on the casing. At the opposite end of the stem is a collar portion K which fits in the machined end of the case and abuts against the plug cap G. The worm F on the stem engages a corresponding worm gear L formed in the periphery of the gate C and the latter is pivoted upon a pin M.

The casing A is further provided with central cylindrical portions N and O on opposite sides of the chamber portion and through which a straight-way passage P is formed, the portion N is threaded or otherwise adapted for attachment with the conduit in which the valve is located and the portion O is provided with a cap Q having a similar thread or attachment means. The portion O is bored for the reception of a packing gland R formed integral with the cap Q and the bore is of sufficient diameter to receive the seat fittings for the valves. One of these seat fittings S engages a machined recess in the portion N and forms an annular seat having its ends in a plane perpendicular to the axis of the bore. The opposite seat fitting T is sleeved upon the end of the gland R and is of a diameter to fit the bore in the portion O.

U is a metallic packing ring sleeved upon the gland R, and V is a fibrous packing interposed between the ring U and the bearing T.

W is a spring surrounding the gland R and within the bore of the portion O, the outer end of said spring abutting against the cap Q. This cap Q is secured by cap bolts X or other suitable means to the main case and the flange of the cap is of sufficient area to cover the bore through which the pin M is inserted to form a pivot for the valve C.

With the construction as described the valve C bears against the annular seat S against which it is pressed when the valve is closed. On the other side of the valve the annular member T is held in gas tight contact by the tension of the spring W, which spring also places sufficient pressure upon the fibrous packing V to prevent leakage around the member T. The valve thus constructed may be used continuously without requiring adjustment or repacking as the spring W will at all times take up the wear and hold the packing so as to form a gas tight joint.

What I claim as my invention is,—

1. A valve comprising a casing having a straightway passage formed therethrough and a transversely extending chamber open at one side, of a seat bushing insertible through one end of said straightway passage and having a bearing on the opposite side of said transverse chamber, a gate valve in said chamber bearing against said seat, a seat bushing on the opposite side of said gate valve and bearing thereagainst, a bushing on which said last-mentioned seat bushing is sleeved, a packing gland thereon, and resilient means for constantly pressing upon said packing gland and last-mentioned seat bushing.

2. A valve comprising an integral casing having a straightway passage formed therethrough and a transversely extending chamber open at one end, a seat bushing insertible through one end of said straightway passage and having a bearing therein on the opposite side of said transverse chamber, a gate valve in said chamber bearing against said bushing, a seat bushing bearing against the opposite face of said valve, a bushing secured to the outer end of said straightway passage, a spring surrounding said bushing and located in an enlarged portion of said straightway passage, and a packing gland surrounding said fixed bushing against which said spring bears, the pressure on said packing gland also operating upon said last-mentioned seat bushing.

3. A valve comprising an integral casing having a straightway passage formed therethrough and a transversely extending chamber open at one side, a seat bushing insertible through one end of said straightway passage and having a bearing on the opposite side of said transverse chamber, a gate in said transverse chamber bearing against said seat bushing, a second seat bushing bearing against the opposite side of said gate, a bushing having a longitudinal slidable engagement with said second seat bushing and fixedly secured to said casing, a spring surrounding said fixed bushing, a packing gland surrounding said fixed bushing against which said spring bears, said gland having bearing against said second seat bushing by which the latter is resiliently pressed against said gate.

In testimony whereof I affix my signature in presence of two witnesses.

CHARLES W. WARD.

Witnesses:
C. T. HARRINGTON,
MARGARET WARD.